Patented Mar. 21, 1939

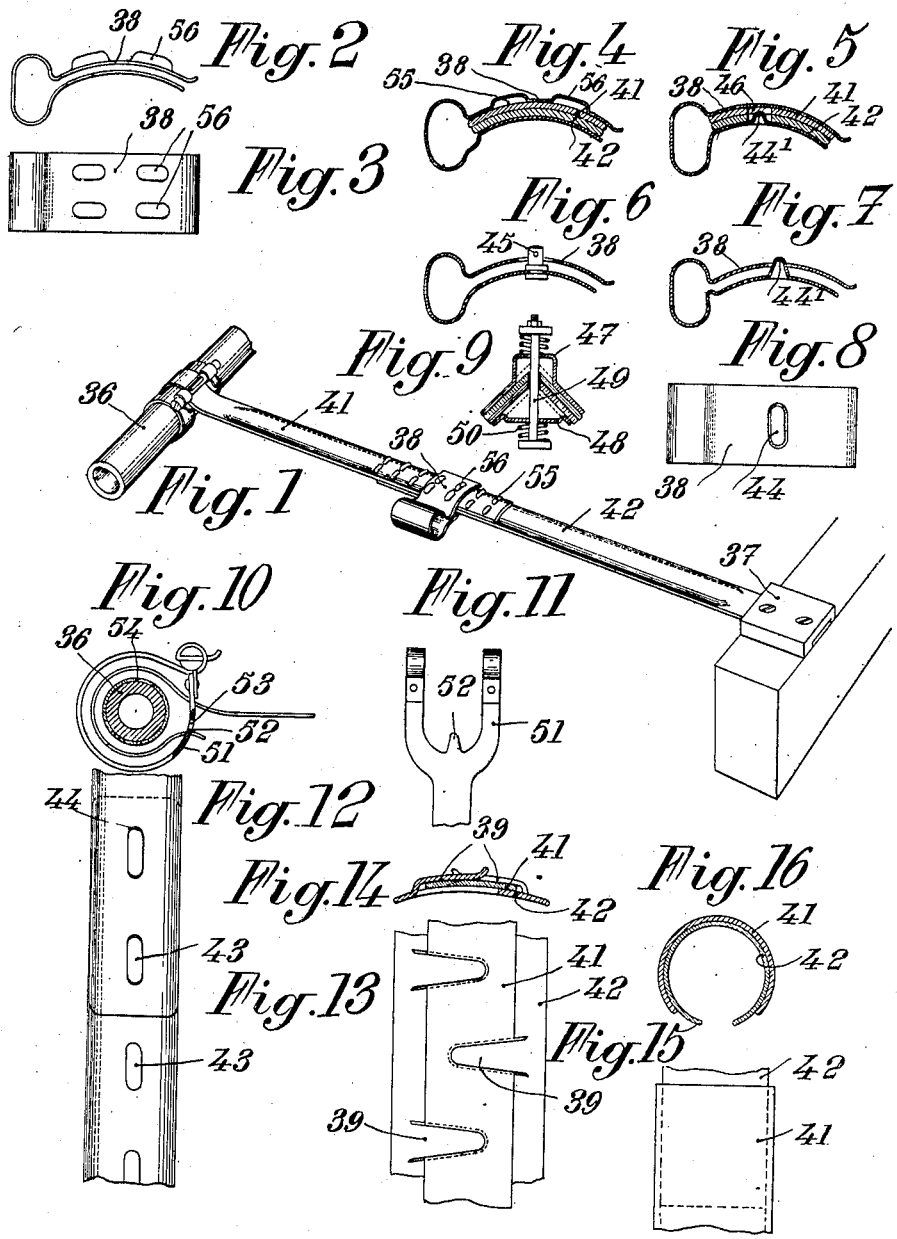

2,151,280

UNITED STATES PATENT OFFICE 2,151,280

MEANS FOR DAMPING THE VIBRATIONS OF PIPES

Auguste Louis Marie Antoine Rouy, Paris, France

Original application December 23, 1935, Serial No. 55,876. Divided and this application July 9, 1937, Serial No. 152,833. In Luxemburg October 16, 1935

7 Claims. (Cl. 188—1)

The present invention relates to means for damping the vibrations of pipes or tubes carried by a fixed or movable body, for example aircraft, with a view to preventing the fracture of said piping which is often produced by such vibrations.

This application is a division of my copending application, Serial No. 55,876, filed December 23, 1935.

According to the present invention the tubes or pipes whose vibrations it is desired to damp are provided with at least one vibration damping system arranged in such a way as to destroy the kinetic energy which tends to maintain the said oscillations, the assembly being such as to avoid the accumulation of the vibratory energy.

Preferred embodiments of the present invention will be hereinafter described, with reference to the accompanying drawing, given merely by way of example, and in which:

Fig. 1 shows a pipe provided, according to the invention, with a vibration damping device of the same kind;

Fig. 2 is a side view of a clamp for this vibration damping device, according to the present invention;

Fig. 3 is a plan view corresponding to Fig. 2;

Fig. 4 and 5 are transverse sectional views of devices similar to that shown by Fig. 2, made according to two different embodiments of the invention;

Fig. 6 is a sectional view of a clamp analogous to that shown by Figs. 2 and 3, made according to another embodiment;

Figs. 7 and 8 are a sectional view and a plan view, respectively, of still another embodiment of said clamp;

Fig. 9 is a sectional view of a system such as that shown by Fig. 1, but made according to still another embodiment of the invention;

Fig. 10 is a sectional view of a pipe and the part of the vibration damping device that is associated therewith;

Fig. 11 is a separate view of a member for the fixation of said device on the pipe;

Fig. 12 is a plan view of the combination of two friction elements of the vibration damping device, made according to an embodiment different from that of Fig. 1;

Figs. 13 and 14 are a plan view and a sectional view, respectively, of a vibration damping device of the kind of that shown by Fig. 1, made according to two other embodiments of the invention;

Figs. 15 and 16 are views similar to Figs. 13 and 14, respectively, corresponding to still another embodiment of the invention.

For the purpose of the invention, connecting means are provided between the tubes or pipes and the mechanism or unit that carries them in such a way that the said connecting means are capable of giving rise to relative displacements with friction of two parts in relation to one another. These two parts may be constituted notably either by the piping or by a member which connects it to the mechanism, or by such a member and a part solid with the mechanism, or by two elements forming the connection between the piping and the mechanism.

According to this latter arrangement this connection is constituted for example by two steel blades 41, 42, Figure 1 (or blades of any other material, metallic or non-metallic) capable of slipping upon one another over a suitable length, with or without frictional lining, one being fixed to the tube 36 to be damped, and the other to the mechanism at 37, and advantageously the said blades are given either a slightly concave shape, or any other shape, for instance a V-shape (Figure 9) adapted to give them an appropriate transverse rigidity, in which case the said blades, just as when they are plane, are kept pressed against one another by any suitable means, for instance by a clip 38 fitted upon the covering parts (Figures 1 to 9), or by tongues 39 cut out in the metal of one and bearing upon the other (Figures 13 and 14). Alternatively they may be given such a form that they cover one upon the other so as to ensure at the same time the maintenance of the necessary friction, the said blades consisting for example of portions of tubes of different diameters, penetrating resiliently one into the other (Figs. 15 and 16).

Of course means may be provided for limiting the relative displacements of the two parts between which the friction is exerted, these means consisting for instance, in the particular case in which the said parts are steel blades, of projections 43 (Figure 12) pressed back in one of the blades and engaging with a suitable amount of clearance in hollows or recesses 44 formed in the other.

Similarly it is possible, when a clip 38 is utilised, to provide means for preventing it from creeping. These means themselves may be constituted (Figures 1 to 4) by projections 55 formed on one of the blades and penetrating into recesses 56 formed in the clip.

Furthermore the means for limiting the relative displacements and those for obviating the travelling or creeping of the clip might be combined, as illustrated in Figures 5 to 8. To this end a projection 44¹ (Figures 5, 7 and 8) or a spur 45 (Figure 6), carried by the clip, may pass through apertures 46 pierced in the blades 41, 42.

The clip 38 may also be replaced by two gripping or tightening pieces 47, 48, resiliently united to one another, through the blades, by a bolt 49 and springs 50 (Figure 9).

Finally, concerning the fixing upon the tube of the corresponding blade 41, it may be arranged in any suitable manner, for instance by the aid of a gripping collar 51, upon a projection 52 of which is anchored the extremity of the said blade, pierced with a hole 53, in which engages this projection 52 (Figures 10 and 11).

One of the extremities of the collar has preferably the form of a coping, to enable the tube to be enveloped by the end of the blade 41, with optional insertion of a packing 54.

As is obvious, and already follows, moreover, from the foregoing, the invention is by no means limited to those of its modes of application, any more than to those of the embodiments of its various parts that have more especially been described; it embraces, on the contrary, any modifications thereof, which come within the scope of the invention.

What I claim is:

1. In a structure including a pipe and a machine by which said pipe is supported, a device for damping vibrations of said pipe caused by said machine which comprises, in combination, friction members rigid with said pipe and said machine, respectively, and spring means for causing said members to rub against each other with a given pressure.

2. In a structure including a machine and a pipe carried by said machine, a device for damping vibrations of said pipe caused by said machine, which comprises, in combination, a metal blade fixed to said pipe extending transversely thereto, a second metal blade in line with the first mentioned one fixed to said machine, these two blades overlapping each other over a certain length, and spring means for causing said blades to rub against each other along their overlapping parts.

3. A device according to claim 2 in which said spring means consist of a metal clip the branches of which extend along the external faces of the overlapping parts of said blades, respectively.

4. A vibration damping device according to claim 2 in which said spring means consist of small tongues cut in the metal of at least one of said blades and extending over the surface of the other blade, so as to imprison said second mentioned blade between said tongues and the first mentioned blades.

5. A vibration damping according to claim 2 in which said blades have, in cross section, the shape of portions of circles of corresponding diameters, so that they engage elastically into one another, the spring means being constituted by the edges of said blades themselves.

6. A vibration damping device according to claim 2 further including means for limiting the relative displacements of said blades with respect to each other.

7. A vibration damping device according to claim 2 in which said spring means consist of a metal clip the branches of which extend along the outer faces of the overlapping parts of said blades, respectively, further including means for limiting displacements of said clip with respect to said blades.

AUGUSTE LOUIS MARIE ANTOINE ROUY.